(12) United States Patent
Li

(10) Patent No.: US 12,217,462 B2
(45) Date of Patent: Feb. 4, 2025

(54) IMAGE PROCESSING METHOD AND APPARATUS, ELECTRONIC DEVICE, AND STORAGE MEDIUM FOR REDUCING TIME DELAY CAUSED BY DECODING AN IMAGE SEQUENCE AND IMPROVING THE SMOOTHNESS OF IMAGE PROCESSING

(71) Applicant: Tencent Technology (Shenzhen) Company Limited, Shenzhen (CN)

(72) Inventor: Xiao Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 408 days.

(21) Appl. No.: 17/728,810

(22) Filed: Apr. 25, 2022

(65) Prior Publication Data

US 2022/0254069 A1  Aug. 11, 2022

Related U.S. Application Data

(63) Continuation of application No. PCT/CN2021/095054, filed on May 21, 2021.

(30) Foreign Application Priority Data

Jul. 1, 2020 (CN) .......................... 202010626281.7

(51) Int. Cl.
  *G06T 9/00* (2006.01)
  *H04N 19/105* (2014.01)
  (Continued)

(52) U.S. Cl.
  CPC ............. *G06T 9/00* (2013.01); *H04N 19/105* (2014.11); *H04N 19/132* (2014.11); *H04N 19/172* (2014.11); *H04N 19/20* (2014.11)

(58) Field of Classification Search
  CPC ...... G06T 9/00; H04N 19/105; H04N 19/132; H04N 19/172; H04N 19/20; H04N 19/156;
  (Continued)

(56) References Cited

U.S. PATENT DOCUMENTS

| 7,822,123 | B2* | 10/2010 | Lin ........................ H04N 19/59 375/240.24 |
| 9,967,579 | B2 | 5/2018 | Xu et al. |

(Continued)

FOREIGN PATENT DOCUMENTS

| CN | 103780908 A | 5/2014 |
| CN | 104113777 A | 10/2014 |

(Continued)

OTHER PUBLICATIONS

Tencent Technology, ISR, PCT/CN2021/095054, Jul. 29, 2021, 2 pgs.

(Continued)

*Primary Examiner* — Siamak Harandi
(74) *Attorney, Agent, or Firm* — Morgan, Lewis & Bockius LLP

(57) ABSTRACT

This application discloses an image processing method performed by an electronic device. The method includes: receiving padding frame information transmitted by a server and an image frame set of a to-be-processed image sequence; inputting the image frame set to a cache queue of a decoder, and determining an image frame currently located at the first position of the cache queue as a target image frame; inserting padding frames between the target image frame and a next image frame subsequent the target image frame based on padding frame information, and performing the step of inserting padding frames between the target image frame and a next image frame subsequent the target (Continued)

image frame based on the padding frame information, until all image frames in the image frame set are decoded; and processing the decoded image frames and displaying a processing result. The solution reduces time delay caused by decoding an image sequence.

20 Claims, 9 Drawing Sheets

(51) Int. Cl.
*H04N 19/132* (2014.01)
*H04N 19/172* (2014.01)
*H04N 19/20* (2014.01)

(58) Field of Classification Search
CPC .... H04N 19/44; H04N 21/4331; H04N 21/44; H04N 21/4781
See application file for complete search history.

(56) References Cited

U.S. PATENT DOCUMENTS

| | | |
|---|---|---|
| 2005/0152457 A1 | 7/2005 | Regunathan et al. |
| 2007/0081588 A1* | 4/2007 | Raveendran ......... H04N 19/187 375/240.1 |
| 2009/0010337 A1* | 1/2009 | Wang .................. H04N 19/563 375/E7.123 |
| 2010/0278268 A1 | 11/2010 | Lee et al. |
| 2016/0014423 A1 | 1/2016 | Xu et al. |

FOREIGN PATENT DOCUMENTS

| | | |
|---|---|---|
| CN | 104113778 A | 10/2014 |
| CN | 110366033 A | 10/2019 |
| CN | 111901666 A | 11/2020 |
| JP | 2016059015 A | 4/2016 |
| WO | WO 2002071639 A1 | 9/2002 |
| WO | WO 2018195405 A1 | 10/2018 |

OTHER PUBLICATIONS

Tencent Technology, Extended European Search Report and Supplementary Search Report, EP21834613.8, Dec. 5, 2022, 9 pgs.
Tencent Technology, WO, PCT/CN2021/095054, Jul. 29, 2021, 5 pgs.
Tencent Technology, IPRP, PCT/CN2021/095054, Dec. 13, 2022, 6 pgs.

* cited by examiner

IMAGE PROCESSING METHOD AND APPARATUS, ELECTRONIC DEVICE, AND STORAGE MEDIUM FOR REDUCING TIME DELAY CAUSED BY DECODING AN IMAGE SEQUENCE AND IMPROVING THE SMOOTHNESS OF IMAGE PROCESSING

CROSS-REFERENCE TO RELATED APPLICATIONS

This application is a continuation application of PCT Patent Application No. PCT/CN2021/095054, entitled "IMAGE PROCESSING METHOD AND APPARATUS, ELECTRONIC DEVICE AND STORAGE MEDIUM" filed on May 21, 2021, which claims priority to Chinese Patent Application No. 202010626281.7, filed with the State Intellectual Property Office of the People's Republic of China on Jul. 1, 2020, and entitled "IMAGE PROCESSING METHOD AND APPARATUS, ELECTRONIC DEVICE, AND STORAGE MEDIUM", all of which are incorporated herein by reference in their entirety.

FIELD OF THE TECHNOLOGY

This application relates to the field of computer technologies, and specifically, to an image processing method and apparatus, an electronic device, and a storage medium.

BACKGROUND OF THE DISCLOSURE

More users start to watch videos online through terminals such as a mobile phone, a tablet computer, and a personal computer, and with the development of mobile terminals and network technologies, corresponding content in games can also be displayed to users in a video playing manner. Using cloud gaming as an example, in the cloud gaming scenario, the game does not run on a game terminal of a player, but runs on a cloud server, and the cloud server renders the game scene into a video and audio stream, and transmits the video and audio stream to the terminal of the player through the network. The terminal of the player does not need to have powerful graphics computing and data processing capabilities, but only needs to have basic streaming media playback capabilities and the capability to obtain player input commands and transmit the commands to the cloud server.

SUMMARY

Embodiments of this application provide an image processing method and apparatus, an electronic device, and a storage medium, which can reduce time delay caused by decoding an image sequence and improve the smoothness of image processing.

An embodiment of this application provides an image processing method, including:

receiving padding frame information transmitted by a server and an image frame set of a to-be-processed image sequence, the padding frame information being generated by the server according to the image frame set;

inputting the image frame set frame by frame to a cache queue of a decoder, and determining an image frame currently located at the first position of the cache queue as a target image frame;

inserting padding frames between the target image frame and a next image frame subsequent the target image frame based on the padding frame information, so that the remaining frames other than the target image frame in the cache queue are the padding frames;

using the next image frame subsequent the target image frame as a new target image frame in response to detecting that the target image frame is decoded, and performing the operation of inserting padding frames between the new target image frame and a next image frame subsequent the new target image frame based on the padding frame information, until all image frames in the image frame set are decoded; and processing the decoded image frames and displaying a processing result of the decoded image frames.

An embodiment of this application further provides an electronic device, including a memory, a processor, and a computer program stored in the memory and capable of being run on the processor, the processor, when executing the program, causing the electronic device to implement the operations of the image processing method described above.

An embodiment of this application further provides a non-transitory computer-readable storage medium, storing a computer program, the computer program, when executed by a processor, causing the electronic device to implement the operations of the image processing method described above.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show only some embodiments of the present invention, and a person skilled in the art may still derive other accompanying drawings according to the accompanying drawings without creative efforts.

DESCRIPTION OF EMBODIMENTS

The technical solutions of this application are clearly and completely described below with reference to the accompanying drawings of this application. Apparently, the described embodiments are merely some rather than all of the embodiments of the present invention. All other embodiments obtained by a person of ordinary skill in the art based on the embodiments of the present invention without creative efforts shall fall within the protection scope of the present invention.

In some cloud gaming scenarios, limited by the decoding capability of the terminal of the player, in a decoding solution, a decoding frame cache of video hardware greatly affects the overall delay, which may cause lagging in the finally played video.

Embodiments of this application provide an image processing method and apparatus, an electronic device, and a storage medium, which can reduce time delay caused by decoding an image sequence and improve the smoothness of image processing.

In the embodiments of this application, after padding frame information transmitted by a server and an image frame set of a to-be-processed image sequence are received, the padding frame information being generated by the server according to the image frame set, the image frame set is inputted frame by frame to a cache queue of a decoder and an image frame currently located at the first position of the cache queue is determined as a target image frame. Next, padding frames are inserted between the target image frame and a next image frame subsequent the target image frame based on the padding frame information, so that the remaining frames other than the target image frame in the cache queue are the padding frames. The next image frame subsequent the target image frame is used as a new target image frame when it is detected that the target image frame is decoded, and the step of inserting padding frames between the target image frame and a next image frame subsequent the target image frame based on the padding frame information is performed, until all image frames are decoded. Finally, the decoded image frames are processed and a processing result is displayed. Therefore, the solution can reduce time delay caused by video decoding, thereby improving the smoothness of image processing.

Specifically, the image processing apparatus may be specifically integrated in a terminal, and the terminal may be a smart phone, a tablet computer, a notebook computer, a desktop computer, a smart speaker, a smart watch, or the like, but is not limited thereto. The terminal and the server may be directly or indirectly connected in a wired or wireless communication manner. This is not limited in this application.

Figure 1A:
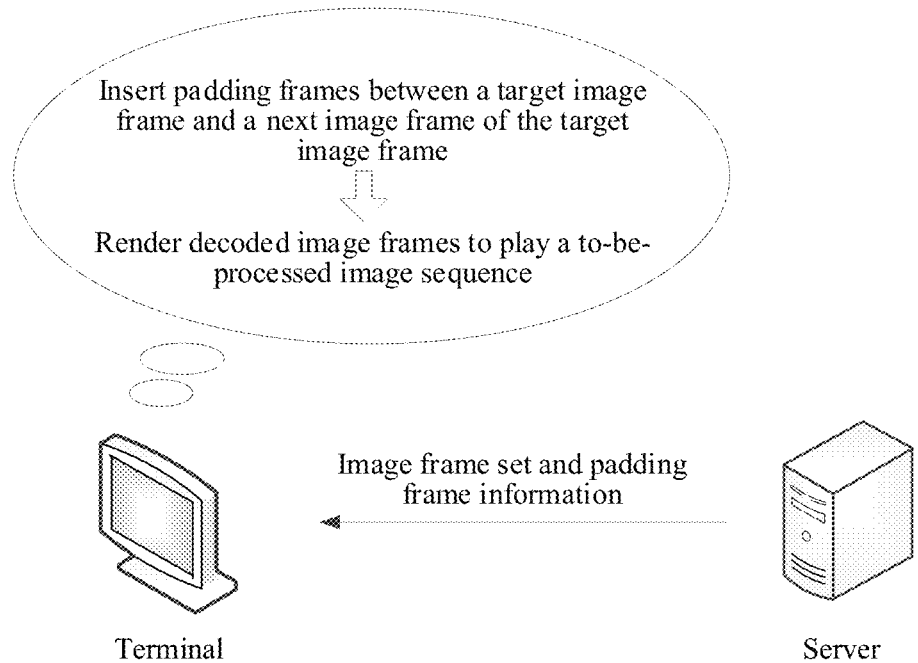
FIG. 1A is a schematic diagram of a scenario of an image processing method according to an embodiment of this application.

For example, referring to FIG. 1A, the image processing apparatus is integrated on a terminal, and the terminal can receive padding frame information transmitted by a server and an image frame set of a to-be-processed image sequence. The padding frame information is generated by the server according to the image frame set, and the server is a cloud server. In the cloud gaming scenario, the cloud server renders the game scene into a video and audio stream (that is, video stream data), and transmits the video and audio stream to a user terminal through the network. Then, the terminal inputs the image frame set frame by frame to a cache queue of a decoder, and determines an image frame currently located at the first position of the cache queue as a target image frame. Next, the terminal inserts padding frames between the target image frame and a next image frame subsequent the target image frame based on the padding frame information, so that the remaining frames other than the target image frame in the cache queue are the padding frames. Next, the terminal uses the next image frame subsequent the target image frame as a new target image frame in response to detecting that the target image frame is decoded, and performs the operation of inserting padding frames between the target image frame and a next image frame subsequent the target image frame based on the padding frame information, until all image frames in the image frame set are decoded. Finally, the terminal renders the decoded image frames to play the image sequence.

In the image processing method provided in this application, the padding frames are inserted between the target image frame and the next image frame subsequent the target image frame, so that the target image frame is located at the first position of the cache queue, and the remaining frames other than the target image frame in the cache queue are the padding frames, which improves the speed of decoding the image frame by the terminal, and reduces time delay caused by video decoding, thereby improving the efficiency of image processing.

Detailed descriptions are separately performed below. A description order of the following embodiments is not construed as a limitation on a preferred order of the embodiments.

An image processing method is provided, including: receiving padding frame information transmitted by a server and an image frame set of a to-be-processed image sequence; inputting the image frame set frame by frame to a cache queue of a decoder, and determining an image frame currently located at the first position of the cache queue as a target image frame; inserting padding frames between the target image frame and a next image frame subsequent the target image frame based on padding frame information; using the next image frame subsequent the target image frame as a new target image frame in response to detecting that the target image frame is decoded, and performing the step of inserting padding frames between the target image frame and a next image frame subsequent the target image frame based on the padding frame information, until all image frames in the image frame set are decoded; and processing the decoded image frames, and displaying a processing result.

Figure 1B:
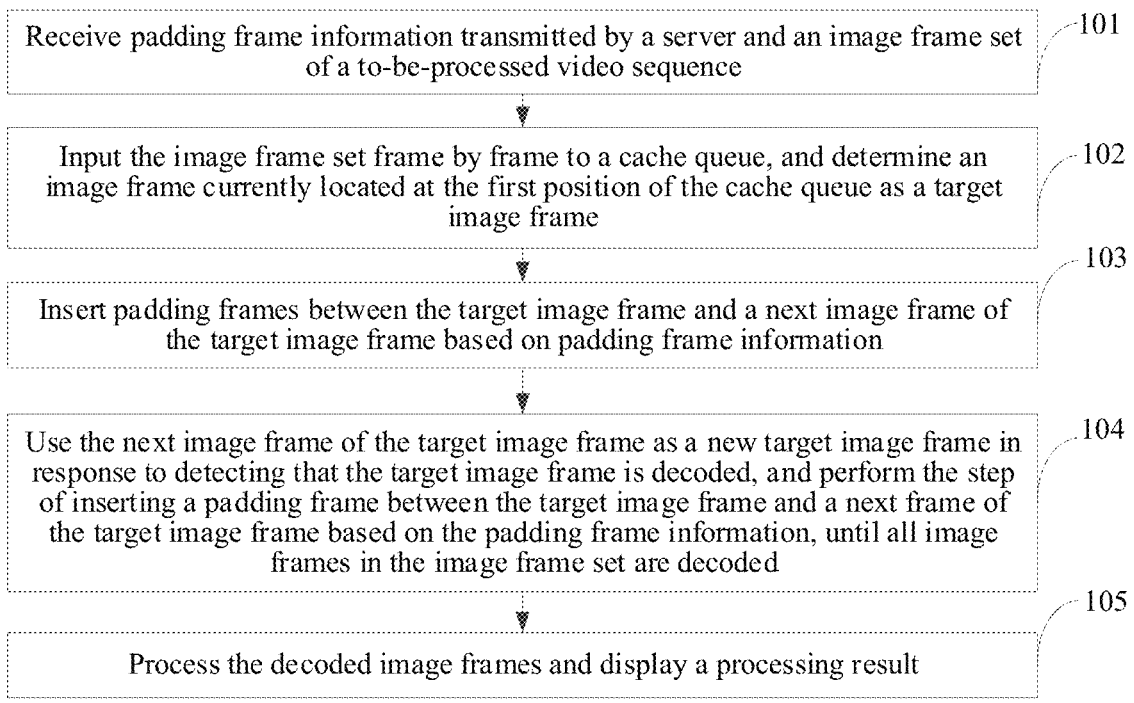
FIG. 1B is a schematic flowchart of an image processing method according to an embodiment of this application.

FIG. 1B is a schematic flowchart of an image processing method according to an embodiment of this application. The image processing method may be performed by a terminal, and a specific process may be as follows:

101. Receive padding frame information transmitted by a server and an image frame set of a to-be-processed image sequence.

The padding frame information is generated by the server according to the image frame set. The terminal can receive video stream data transmitted by the server through a wired network or wireless network. The video stream data carries the padding frame information and the image frame set of the image sequence, and after the video stream data transmitted by the server is received, the video stream data is parsed to obtain the image frame set of the image sequence and the padding frame information generated by the server according to the image frame set. A format of a video data source may be Advanced Video Coding (AVC, that is, H.264 encoding standard) or High Efficiency Video Coding (HEVC, that is, H.265 encoding standard).

First, the following concepts of video encoding are introduced. The so-called video encoding method is compressing an original video image into a binary byte stream through prediction, change, quantization, recombination, and entropy encoding through a compression technology, where encoding methods include: Context-Adaptive Variable-Length Coding (CAVLC) and Context-based Adaptive Binary Arithmetic Coding (CABAC). After obtaining image sequence header information of a to-be-processed image sequence, the server parses the image sequence header information to obtain information such as an image quality level of the image sequence, the quantity of reference frames, whether there are bidirectional prediction frames, and a length corresponding to an image frame sequence, and based on the parsed information, determines whether a padding frame can be generated. When generating a padding frame, the server packs the generated padding frame, a sequence number and an offset corresponding to the padding frame into padding frame information, writes the padding frame information into the image sequence header information, and then transmits the image sequence header information including the padding frame information to the terminal.

102. Input the image frame set frame by frame to a cache queue of a decoder, and determine an image frame currently located at the first position of the cache queue as a target image frame.

To facilitate the storage and transmission of video content, a volume of the video content usually needs to be reduced, that is, an original video image needs to be compressed, and a compression algorithm is also referred to as an encoding format. For example, the server may compress video images by using the H.264 encoding format. When the compressed video content transmitted by the server is received, the compressed video content needs to be decompressed, also referred to as decoding. In terms of video image encoding and decoding, an encoder encodes a plurality of pictures to generate a group of pictures (GOP), and during playing, a decoder reads the GOP section by section for decoding, reads the pictures, and then renders the pictures for display. The GOP is a group of continuous pictures, including a key frame and a plurality of non-key frames, where the key frame is a basic frame (the first frame) of the GOP. There is only one key frame in a group, and the non-key frames include a forward reference frame and a bidirectional reference frame. The key frame is a complete picture, and the forward reference frame and the bidirectional reference frame record changes relative to the key frame. Therefore, the key frame may be independently decoded, while the forward reference frame needs to rely on a previous image frame for decoding, and the bidirectional reference frame needs to rely not only on the previous image frame, but also on a next image frame for decoding. That is, when a video needs to be played, a position of the key frame needs to be first located, so that the video can be played. That is, in some embodiments, the step of "inputting the image frame set frame by frame to a cache queue of a decoder, and determining an image frame currently located at the first position of the cache queue as a target image frame" may specifically include:

(11) obtaining a key frame of a currently rendered to-be-processed image sequence to obtain a target key frame;

(12) determining a next image frame of the target key frame in the image frame set as a target image frame; and

(13) storing the target image frame at the first position of the cache queue.

Currently, video data (that is, image frame set) can be cached between a user terminal and the server through the cache queue. That is, the cache queue is used to cache each to-be-decoded image frame in a first-in first-out order in an image processing process, and only when all cache space in the cache queue is cached with image frames, the terminal decodes the image frame located at the first position of the cache queue.

103. Insert padding frames between the target image frame and a next image frame subsequent the target image frame based on the padding frame information.

The padding frames are inserted between the target image frame and the next image frame subsequent the target image frame, so that the remaining frames other than the target image frame in the cache queue are the padding frames. Using cloud gaming as an example, the cloud gaming, also known as gaming on demand, is an online gaming technology based on a cloud computing technology, and in the cloud gaming, an image frame set transmitted by a server generally includes only a key frame and a forward reference frame. Because a bidirectional reference frame records a difference between a current frame and previous and next frames. That is, to decode the bidirectional reference frame, not only a cached picture before the bidirectional reference frame needs to be obtained, but also a picture after the bidirectional reference frame needs to be decoded. A final picture is obtained by superimposing the previous and next images with data of the current frame. When the bidirectional reference frame needs to be decoded, data of a next frame of the bidirectional reference frame needs to be further obtained. In this case, the next frame of the bidirectional reference frame is still in the cache queue, and therefore, the bidirectional reference frame cannot be decoded, causing lagging in the picture.

The padding frame information includes padding frames corresponding to all image frames in the image frame set. Therefore, a padding frame corresponding to the target image frame can be determined according to the padding frame information, and the determined padding frames can be inserted between the target image frame and the next image frame subsequent the target image frame, so that the target image frame is located at the first position of the cache queue, and the remaining frames other than the target image frame in the cache queue are the padding frames. That is, in some embodiments, the step of "inserting padding frames between the target image frame and a next image frame subsequent the target image frame based on the padding frame information" may specifically include:

(21) extracting a padding frame set generated by the server according to the image frame set from the padding frame information;

(22) selecting a padding frame corresponding to the target image frame in the padding frame set to obtain a target padding frame; and

(23) inserting a preset quantity of target padding frames between the target image frame and the next image frame subsequent the target image frame.

The padding frame is a forward prediction frame, and a frame mode of the padding frame is a skip mode. A P-Skip macroblock is a special P macroblock. For general P macroblocks, a pixel residual and a motion vector residual are written into a code stream, and transmitted from an encoding end to a decoding end. But the P-Skip macroblock is special in that neither the pixel residual nor the motion vector residual is transmitted. The encoding end does not need to transmit other information about the macroblock in addition a small quantity of bytes that identify the macroblock as the P-Skip macroblock. Because the motion vector residual is equal to a difference between a motion vector and a predicted motion vector, the motion vector residual at the encoding end is zero, and the predicted motion vector can be obtained during decoding. That is, during decoding, the motion vector can also be obtained. At the decoding end, there is a reconstructed pixel corresponding to a macroblock of a reference frame. According to the reconstructed pixel and the motion vector, a pixel value of the current macroblock in the current frame can be recovered, which is the so-called P-skip macroblock principle. Literally, the macroblock is skipped, which means that the macroblock is not encoded, and an approximate replacement recovery method is adopted at the decoding end. If a pixel of a macroblock of the current frame and a pixel of a macroblock of the reference frame (the two macroblocks are not required to be in the same position) are almost identical, it is obvious that the macroblock of the current frame does not need to be encoded. At the decoding end, the pixel value of the current macroblock of the current frame can be directly recovered by an approximate substitution method. For example, if there is a ping-pong ball in the first frame, and there is also a ping-pong ball in the second frame, the ping-pong ball macroblock in the second frame is likely to be compiled into a P-Skip macroblock. In this application, the padding frame inserted into the cache queue from the pre-encoding perspective is exactly the same as the target image frame.

Further, to improve the decoding efficiency of the image frame, the padding frames are inserted between the target image frame and the next image frame subsequent the target image frame, so that the cache queue is padded (up to a maximum cache quantity of the cache queue). A padding quantity can be generated according to the maximum cache quantity of the cache queue and the target image frame. Then, target padding frames corresponding to the padding quantity are inserted between the target image frame and the next image frame subsequent the target image frame. That is, in some embodiments, the step of "inserting a preset quantity of target padding frames between the target image frame and the next image frame subsequent the target image frame" may specifically include:

(31) detecting a maximum cache quantity corresponding to the cache queue;

(32) generating a padding quantity according to the target image frame and the maximum cache quantity; and

(33) inserting target padding frames corresponding to the padding quantity between the target image frame and the next image frame subsequent the target image frame.

To ensure the picture continuity of the image sequence after the padding frames are inserted into the cache queue, frame sequence numbers of the padding frames in the cache queue need to be assigned. That is, in some embodiments, the step of "inserting target padding frames corresponding to the padding quantity between the target image frame and the next image frame subsequent the target image frame" specifically further includes:

(41) extracting a frame sequence number of the target image frame; and

(42) assigning frame sequence numbers of the padding frames in the cache queue based on the frame sequence number and positions of the padding frames in the cache queue.

For example, the frame sequence number of the target image frame is 5, 4 padding frames: a padding frame A, a padding frame B, a padding frame C, and a padding frame D, are inserted into the cache queue, and positions of the padding frames are padding frame A—padding frame B—padding frame C—padding frame D, and corresponding frame sequence numbers of the padding frame A, the padding frame B, the padding frame C, and the padding frame D are assigned in an increasing order. In this case, the frame sequence number of the padding frame A is 6, the frame sequence number of the padding frame B is 7, the frame sequence number of the padding frame C is 8, and the frame sequence number of the padding frame D is 9.

In practical applications, for example, in the H.264 encoding format, an H.264 strip refers to an integer number of macroblocks or macroblock pairs arranged in a raster scan order within a specific strip group. However, these macroblocks or macroblock pairs are not necessarily consecutively arranged in the raster scan order within the image. An address of the macroblock is obtained from an address (described in a strip header) of the first macroblock of the strip and a mapping of the macroblock to the strip group. An H.264 strip header is a part of an encoding strip and includes data elements related to the first macroblock or all macroblocks in the strip. That is, an offset corresponding to the padding frames in the cache queue can be extracted from the padding frame information, and the offset refers to an offset of the padding frame in the strip header. Then, based on positions of the frame sequence numbers of the padding frames in the cache queue and the offset corresponding to the padding frames in the cache queue, the frame sequence numbers of the padding frames in the cache queue are assigned. That is, in some embodiments, the step of "assigning frame sequence numbers of the padding frames in the cache queue based on the frame sequence number and positions of the padding frames in the cache queue, so that a frame sequence number of the last padding frame in the cache queue is a second frame sequence number" may specifically include:

(51) extracting an offset corresponding to the padding frames in the cache queue from the padding frame information; and

(52) assigning the frame sequence numbers of the padding frames in the cache queue based on the frame sequence number, the positions of the padding frame in the cache queue, and the offset corresponding to the padding frames in the cache queue.

Specifically, the frame sequence numbers of the padding frames generated by the server are extracted from the padding frame information, and the frame sequence numbers of the padding frames in the cache queue are updated to corresponding frame sequence numbers according to the frame sequence numbers, the positions of the padding frames in the cache queue, and the offset corresponding to the padding frames in the cache queue, so as to ensure the picture continuity of the image sequence after the padding frames are inserted into the cache queue.

104. Use the next image frame subsequent the target image frame as a new target image frame in response to detecting that the target image frame is decoded, and perform the step of inserting padding frames between the new target image frame and a next image frame subsequent the new target image frame based on the padding frame information, until all image frames in the image frame set are decoded.

For example, specifically, when it is detected that the target image frame is decoded, the next image frame subsequent the target image frame is used as a new target image frame, that is, the next image frame subsequent the target image frame is used as a currently processed image frame, and then, padding frames are inserted between the currently processed image frame and a next image frame of the currently processed image frame, that is, the step of inserting padding frames between the target image frame and a next image frame subsequent the target image frame based on the padding frame information is performed until all the image frames in the image frame set are decoded.

Images represented by different key frames are completely different. Therefore, during insertion of the padding frames, whether the currently processed image frame is a key frame needs to be further detected. That is, in some embodiments, the step of "using the next image frame subsequent the target image frame as a new target image frame in response to detecting that the target image frame is decoded, and performing the step of inserting padding frames between the new target image frame and a next image frame subsequent the new target image frame based on the padding frame information, until all image frames in the image frame set are decoded" may specifically include:

(61) using the next image frame subsequent the target image frame as the new target image frame to obtain a currently processed object in response to detecting that the target image frame is decoded;

(62) detecting a type of the currently processed object;

(63) inserting the padding frames between the currently processed object and a next image frame of the currently processed object based on the padding frame information by using a frame sequence number of the currently processed object as a benchmark, when a detection result indicates that the currently processed object is a key frame;

(64) adjusting the frame sequence number of the currently processed object according to a frame sequence number corresponding to a previous frame of the currently processed object in response to detecting that the currently processed object is not the key frame, and inserting the padding frame between the currently processed object and the next image frame of the currently processed object based on the padding frame information; and

(65) performing the step of using the next image frame subsequent the target image frame as the new target image frame to obtain a currently processed object, until all the image frames are decoded.

For example, specifically, if the currently processed object is a key frame, the frame sequence number of the currently processed object is determined as a starting sequence number, and frame sequence numbers of the padding frames are assigned in the cache queue based on the frame sequence number and positions of the padding frames in the cache queue; and if the currently processed object is not the key frame, a frame sequence number corresponding to a previous frame of the currently processed object is obtained, where the previous frame of the currently processed object is the padding frame, that is, a frame sequence number of the currently processed object is adjusted according to the frame sequence number of the previous padding frame, and frame sequence numbers of the padding frames in the cache queue are assigned based on the adjusted frame sequence number of the currently processed object and positions of the padding frames in the cache queue. If the currently processed object is not the key frame, after the frame sequence numbers of the padding frames in the cache queue are assigned based on the adjusted frame sequence number of the currently processed object and the positions of the padding frames in the cache queue, whether the frame sequence number corresponding to the assigned padding frame is greater than a preset threshold needs to be further detected. If yes, the frame sequence number greater than the preset threshold is reset to zero.

105. Process the decoded image frames and display a processing result.

The decoded image frames can be rendered to play the image sequence. In this application, because the padding frame is a P-skip frame, the P-skip frame is only decoded but not rendered, while each video frame in the image frame set is decoded, rendered, and played, so as to reduce time delay caused by video decoding and improve the smoothness of image processing.

In this application, after padding frame information transmitted by a server and an image frame set of a to-be-processed image sequence are received, the image frame set is inputted frame by frame to a cache queue of a decoder and an image frame currently located at the first position of the cache queue is determined as a target image frame. Next, padding frames are inserted between the target image frame and a next image frame subsequent the target image frame based on the padding frame information, so that the remaining frames other than the target image frame in the cache queue are the padding frames. The next image frame subsequent the target image frame is used as a new target image frame when it is detected that the target image frame is decoded, and the step of inserting padding frames between the target image frame and a next image frame subsequent the target image frame based on the padding frame information is performed, until all image frames in the image frame set are decoded. Finally, the decoded image frames are processed and a processing result is displayed. In the image processing method provided in this application, the padding frames are inserted between the target image frame and the next image frame subsequent the target image frame, so that the target image frame is located at the first position of the cache queue, and the remaining frames other than the target image frame in the cache queue are the padding frames, which improves the speed of decoding the image frame by the terminal, and reduces time delay caused by video decoding, thereby improving the efficiency of image processing.

According to the method in this embodiment, the following further provides detailed description by using an example.

In this embodiment, an example in which the image processing apparatus is specifically integrated in a terminal is used for description.

Figure 2A:
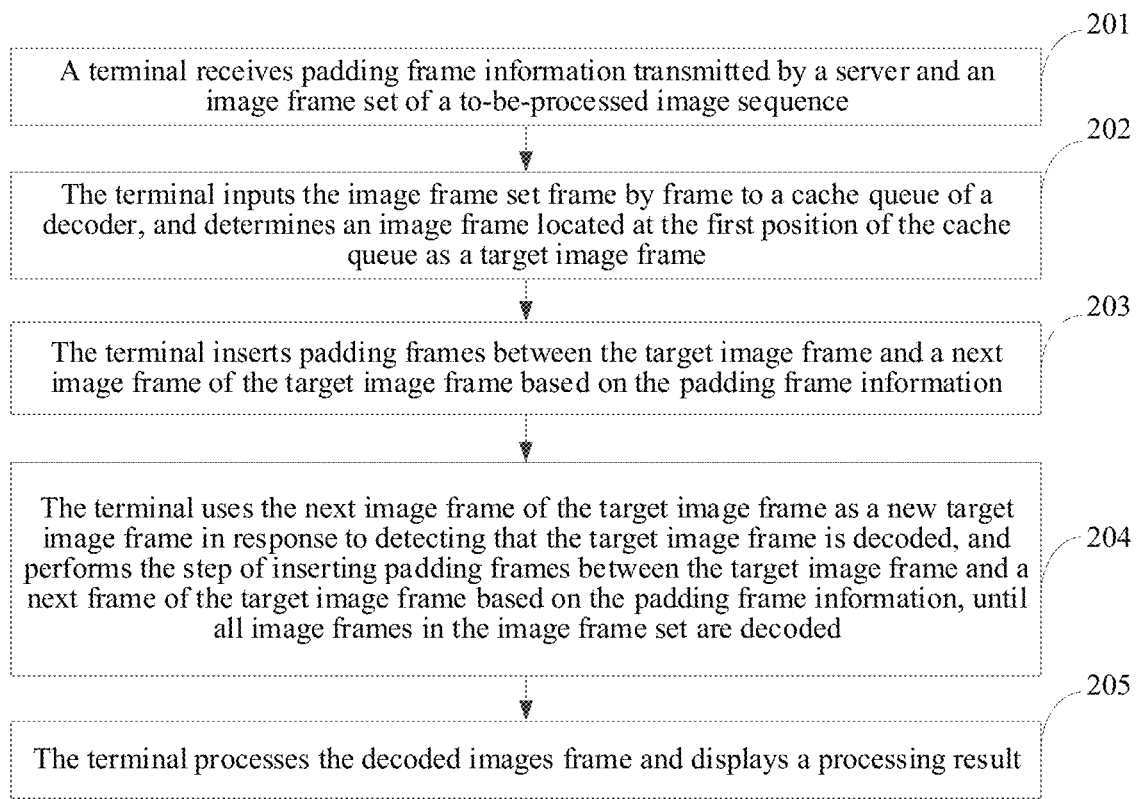
FIG. 2A is another schematic flowchart of an image processing method according to an embodiment of this application.

Referring to FIG. 2A, a specific process of an image processing method may be as follows:

201. A terminal receives padding frame information transmitted by a server and an image frame set of a to-be-processed image sequence.

202. The terminal inputs the image frame set frame by frame to a cache queue of a decoder, and determines an image frame currently located at the first position of the cache queues a target image frame.

When receiving compressed video content transmitted by the server, the terminal needs to decompress the compressed video content. That is, when needing to play a video, the terminal first needs to locate a position of a key frame, so that the video can be played.

203. The terminal inserts padding frames between the target image frame and a next image frame subsequent the target image frame based on the padding frame information.

The padding frame information includes padding frames corresponding to all image frames in the image frame set. Therefore, a padding frame corresponding to the target image frame can be determined according to the padding frame information, and the determined padding frames can be inserted between the target image frame and the next image frame subsequent the target image frame, so that the target image frame is located at the first position of the cache queue, and the remaining frames other than the target image frame in the cache queue are the padding frames.

204. The terminal uses the next image frame subsequent the target image frame as a new target image frame in response to detecting that the target image frame is decoded, and performs the step of inserting padding frames between the new target image frame and a next image frame subsequent the new target image frame based on the padding frame information, until all image frames in the image frame set are decoded.

For example, specifically, if the currently processed object is a key frame, the frame sequence number of the currently processed object is determined as a starting sequence number, and the terminal assigns frame sequence numbers of the padding frames in the cache queue based on the frame sequence number and positions of the padding frames in the cache queue; and if the currently processed object is not the key frame, the terminal obtains a frame sequence number corresponding to a previous frame of the currently processed object, where the previous frame of the currently processed object is the padding frame, that is, the terminal adjusts a frame sequence number of the currently processed object according to the frame sequence number of the previous padding frame, and assigns frame sequence numbers of the padding frames in the cache queue based on the adjusted frame sequence number of the currently processed object and positions of the padding frames in the cache queue. If the currently processed object is not the key frame, after assigning the frame sequence numbers of the padding frames in the cache queue based on the adjusted frame sequence number of the currently processed object and the positions of the padding frames in the cache queue, the terminal needs to further detect whether the frame sequence number corresponding to the assigned padding frame is greater than a preset threshold. If yes, the terminal resets the frame sequence number greater than the preset threshold to zero.

205. The terminal processes the decoded image frames and displays a processing result.

For example, specifically, the decoded image frames are rendered to play the image sequence. In this application, because the padding frame is a P-skip frame, the P-skip frame is only decoded but not rendered, while each video frame in the image frame set is decoded, rendered, and played, so as to reduce time delay caused by video decoding and improve the smoothness of image processing.

In this application, after receiving padding frame information transmitted by a server and an image frame set of a to-be-processed image sequence, the terminal inputs the image frame set frame by frame to a cache queue of a decoder and determines an image frame currently located at the first position of the cache queue as a target image frame. Next, the terminal inserts padding frames between the target image frame and a next image frame subsequent the target image frame based on the padding frame information, so that the remaining frames other than the target image frame in the cache queue are the padding frames. The terminal uses the next image frame subsequent the target image frame as a new target image frame in response to detecting that the target image frame is decoded, and performs the step of inserting padding frames between the new target image frame and a next image frame subsequent the new target image frame based on the padding frame information, until all image frames in the image frame set are decoded. Finally, the terminal processes the decoded image frames and displays a processing result. The terminal provided in this application inserts the padding frames between the target image frame and the next image frame subsequent the target image frame, so that the target image frame is located at the first position of the cache queue, and the remaining frames other than the target image frame in the cache queue are the padding frames, which improves the speed of decoding the image frame by the terminal, and reduces time delay caused by video decoding, thereby improving the efficiency of image processing.

To further understand the image processing solution of this application, referring to FIG. 2B, this application provides an image processing system (hereinafter referred to as the processing system). The processing system includes: a first terminal 10, a second terminal 20, and a server 30. After collecting and encoding a to-be-processed image sequence to generate an H.264 video stream, the terminal 10 transmits image sequence header information of a to-be-played video to the server 30. The image sequence header information includes a sequence parameter set and an image parameter set of the to-be-played video. The sequence parameter set stores a set of global parameters of an encoded video sequence. The so-called encoded video sequence is a sequence including encoded pixel data of frames of an original video. Parameters on which encoded data of each frame depends are stored in the image parameter set. Then, after receiving the image sequence header information, the server 30 parses the image sequence header information to obtain basic format information of the image sequence, including the quantity of reference frames, a video level, a maximum frame sequence, an offset of a frame sequence number in a corresponding strip, and the quantity of image frames of bidirectional reference frames, and determines, based on a parsing result, whether the image sequence can generate a padding frame. Specifically, referring to FIG. 2C, when there is no bidirectional reference frame in the image sequence and the maximum quantity of reference frames is 1, it is determined that the image sequence can generate a padding frame; otherwise, the process ends. Further, when it is determined that the image sequence can generate the padding frame, a corresponding padding frame generation module is determined according to the parsing result. For example, if an entropy encoding mode is a CAVLC mode, a padding frame generation module corresponding to the CAVLC mode is selected. If the entropy encoding mode is a CABAC mode, a padding frame generation module corresponding to the CABAC mode is selected. Then based on the selected padding frame generation module, an encoder is specified to generate a forward reference frame without any motion vector estimation. All macroblock prediction modes are forced to be a P-skip mode (skip mode), and corresponding padding frames are generated by specifying the entropy encoding mode (CAVLC/CABAC). Finally, a padding frame information packaging module encapsulates the generated padding frame, the frame sequence number in the parsing result, and the offset of the frame sequence number in the corresponding strip to obtain the padding frame information. The server 30 transmits the image sequence header information and the padding frame information to the second terminal 20.

Figure 2B:
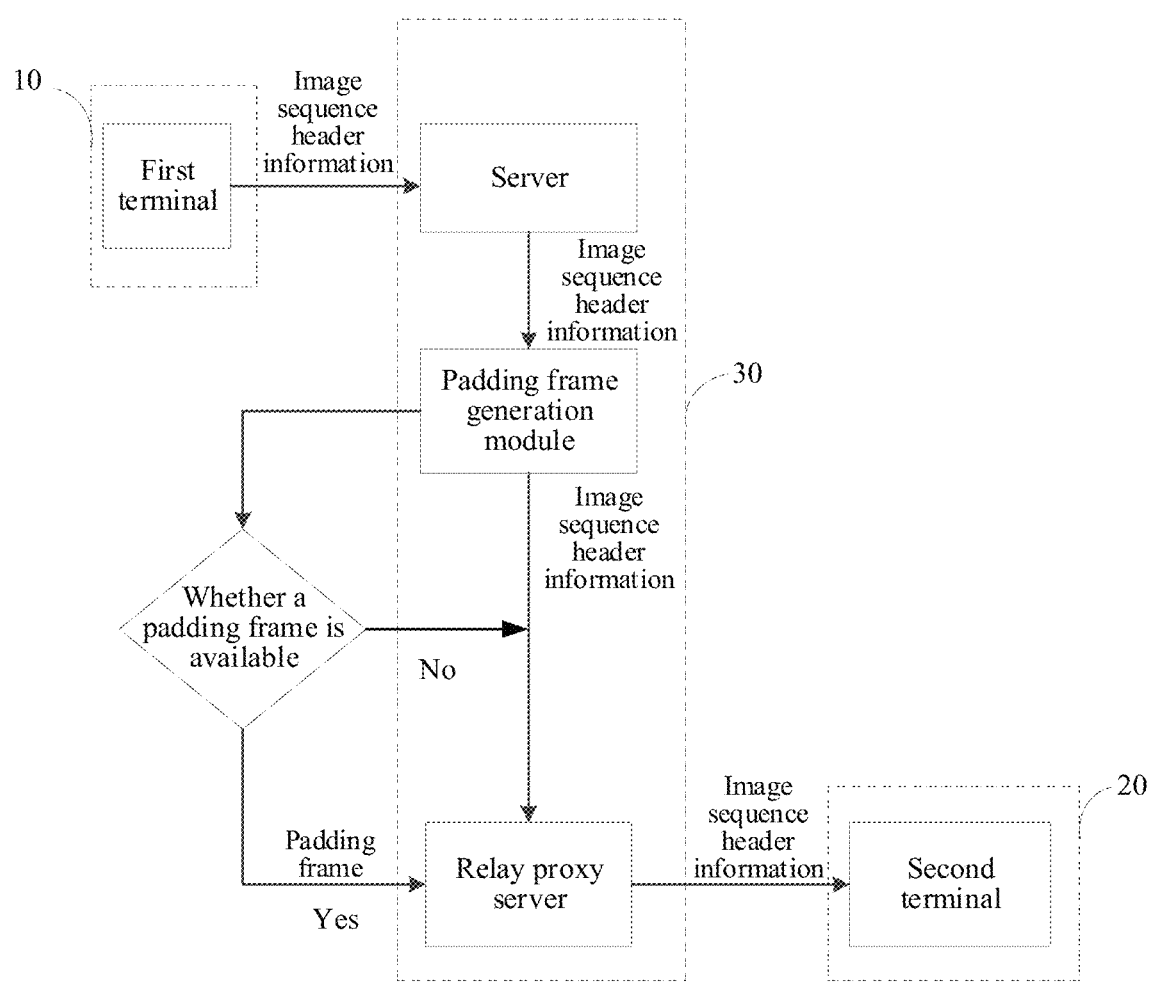
FIG. 2B is a schematic diagram of an image processing system according to an embodiment of this application.
Figure 2C:
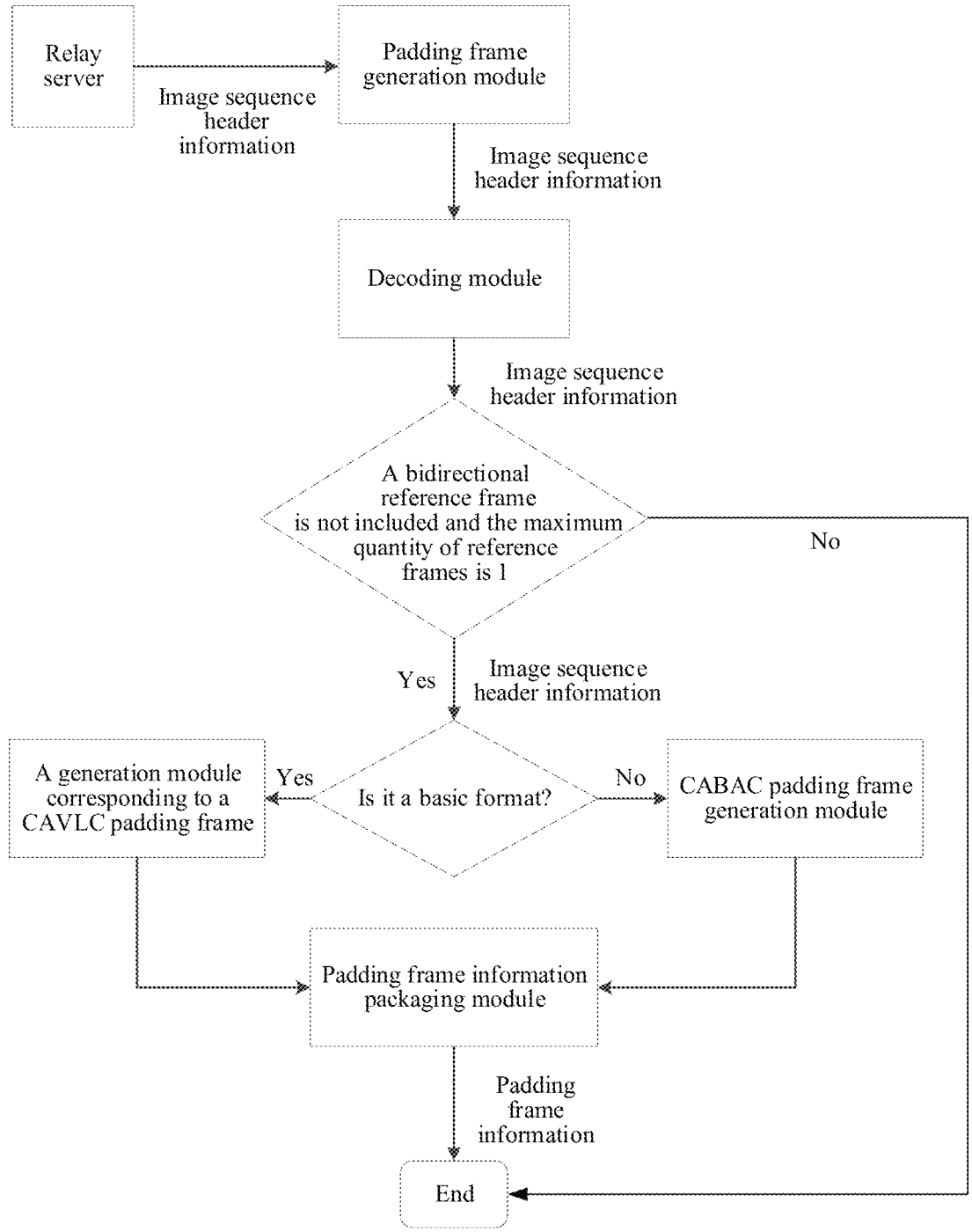
FIG. 2C is a schematic flowchart of generating a padding frame in an image processing method according to an embodiment of this application.
Figure 2D:
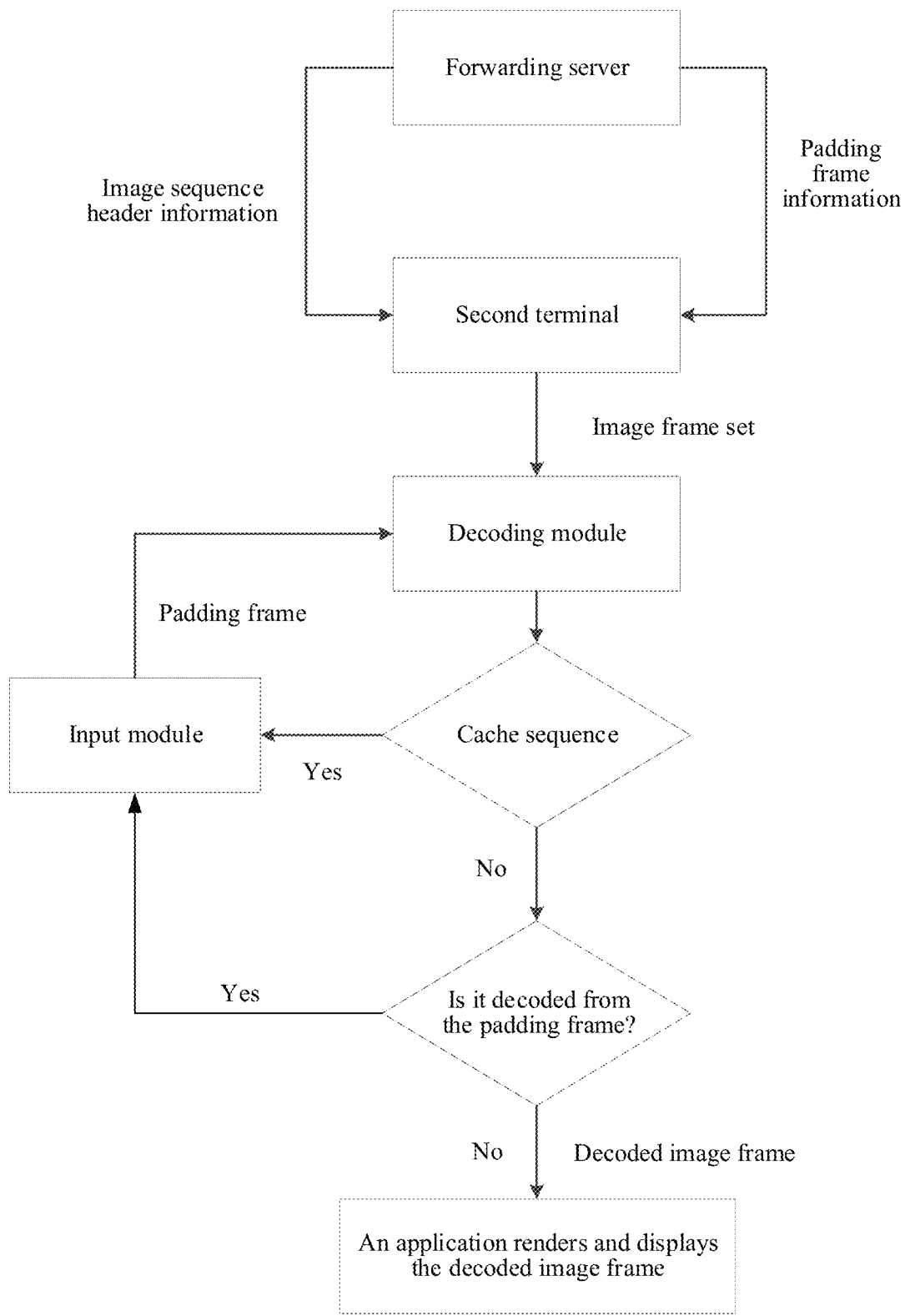
FIG. 2D is a schematic flowchart of processing an image frame set in an image processing method according to an embodiment of this application.

Referring to FIG. 2B, the second terminal 20 receives the image sequence header information and the padding frame information transmitted by the server 30, and the second terminal 20 parses the image sequence header information to obtain the image frame set of the image sequence. Then the second terminal 20 inserts the image frame set frame by frame to a decoding module of the second terminal 20. If there is a cache queue during decoding, the second terminal 20 extracts the padding frame generated by the server 30 from the padding frame information. Next, the second terminal 20 determines, according to the image frame set, that an image frame currently at the first position of the cache queue is a target image frame, and inserts the padding frames between the target image frame and a next image frame subsequent the target image frame based on the padding frame information. Then, the second terminal 20 respectively updates frame sequence numbers of the padding frame and the target image frame in the cache queue according to the offset in the padding frame information, so as to ensure the picture continuity of the image sequence. For details, refer to the foregoing embodiments, which are not repeated herein. In addition, if there is no cache queue during decoding, a padding frame generation module in the server 30 transmits the image sequence header information to a relay proxy server, so that the second terminal 20 receives the image sequence header information transmitted by the relay proxy server and displays the image sequence. If the decoded video frame is a padding frame, the padding frame is not rendered, and a decoding step is performed to play the to-be-played video.

To help better implement the image processing method of this application, this application further provides an image processing apparatus based on the foregoing method. Terms have meanings the same as those in the foregoing image processing method. For specific implementation details, reference may be made to the description in the method embodiments.

Figure 3A:
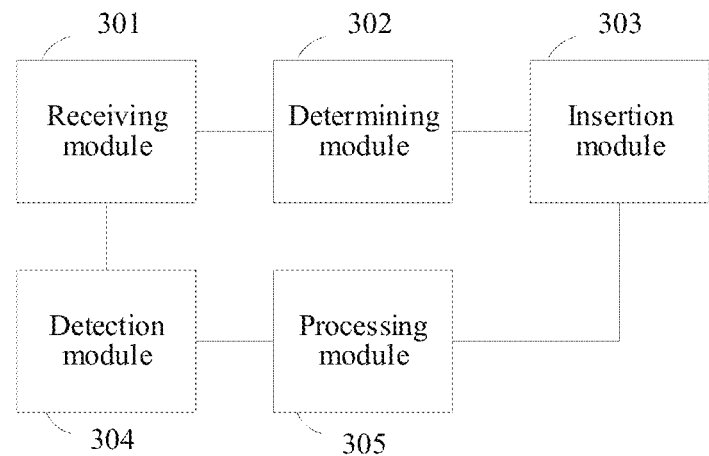
FIG. 3A is a schematic structural diagram of an image processing apparatus according to an embodiment of this application.

FIG. 3A is a schematic structural diagram of an image processing apparatus according to this application. The image processing apparatus may include a receiving module 301, a determining module 302, an insertion module 303, a detection module 304, and a rendering module 305, which may be specifically as follows:

The receiving module 301 is configured to receive padding frame information transmitted by a server and an image frame set of a to-be-processed image sequence.

The padding frame information is generated by the server according to the image frame set. The receiving module 301 can receive video stream data transmitted by the server through a wired network or wireless network. The video stream data carries the padding frame information and the image frame set of the image sequence, and after the video stream data transmitted by the server is received, the video stream data is parsed to obtain the image frame set of the image sequence and the padding frame information generated by the server according to the image frame set. A format of a video data source may be AVC (that is, H.264 encoding standard) or HEVC (that is, H.265 encoding standard).

The determining module 302 is configured to input the image frame set frame by frame to a cache queue of a decoder, and determine an image frame currently located at the first position of the cache queue as a target image frame.

To facilitate the storage and transmission of video content, a volume of the video content usually needs to be reduced, that is, an original video image needs to be compressed, and a compression algorithm is also referred to as an encoding format. For example, a video image can be compressed by using the H.264 encoding format. When the determining module 302 receives compressed video content transmitted by the server, the terminal needs to decompress the compressed video content. That is, when needing to play a video, the determining module 302 first needs to locate a position of a key frame, so that the video can be played.

In some embodiments, the determining module 302 may be specifically configured to: obtain a key frame of a currently rendered to-be-processed image sequence to obtain a target key frame, determine a next image frame of the target key frame in the image frame set as a target image frame, and store the target image frame at the first position of the cache queue.

The insertion module 303 is configured to insert padding frames between the target image frame and a next image frame subsequent the target image frame based on the padding frame information.

The padding frame information includes padding frames corresponding to all image frames in the image frame set. Therefore, the insertion module 303 can determine a padding frame corresponding to the target image frame according to the padding frame information, and insert the determined padding frames between the target image frame and the next image frame subsequent the target image frame, so that the target image frame is located at the first position of the cache queue, and the remaining frames other than the target image frame in the cache queue are the padding frames.

In some embodiments, the insertion module 303 may specifically include:

a first extraction unit, configured to extract a padding frame set generated by the server according to the image frame set from the padding frame information;

a selection unit, configured to select a padding frame corresponding to the target image frame in the padding frame set to obtain a target padding frame; and an insertion unit, configured to insert a preset quantity of target padding frames between the target image frame and the next image frame subsequent the target image frame.

In some embodiments, the insertion unit may be specifically configured to: detect a maximum cache quantity corresponding to the cache queue, generate a padding quantity according to the target image frame and the maximum cache quantity, and insert target padding frames corresponding to the padding quantity between the target image frame and the next image frame subsequent the target image frame.

Figure 3B:
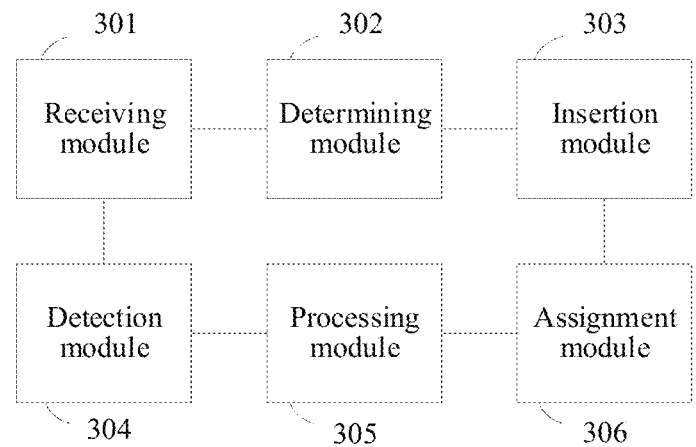
FIG. 3B is another schematic structural diagram of an image processing apparatus according to an embodiment of this application.

In some embodiments, referring to FIG. 3B, the image processing apparatus may further include an assignment module 306, and the assignment module 306 includes:

a second extraction unit, configured to extract a frame sequence number of the target image frame; and an assignment unit, configured to assign frame sequence numbers of the padding frames in the cache queue based on the frame sequence number and positions of the padding frames in the cache queue.

In some embodiments, the assignment unit may be specifically configured to: extract an offset corresponding to the padding frames in the cache queue from the padding frame information, and assign the frame sequence numbers of the padding frames in the cache queue based on the frame sequence number, the positions of the padding frames in the cache queue, and the offset corresponding to the padding frames in the cache queue.

The detection module 304 is configured to: use the next image frame subsequent the target image frame as a new target image frame in response to detecting that the target image frame is decoded, and perform the operation of inserting padding frames between the new target image frame and a next image frame subsequent the new target image frame based on the padding frame information, until all image frames in the image frame set are decoded.

For example, specifically, if a currently processed object is a key frame, a frame sequence number of the currently processed object is determined as a starting sequence number, and the detection module 304 assigns frame sequence numbers of the padding frames in the cache queue based on the frame sequence number and positions of the padding frames in the cache queue; and if the currently processed object is not the key frame, the terminal obtains a frame sequence number corresponding to a previous frame of the currently processed object, where the previous frame of the currently processed object is the padding frame, that is, the detection module 304 adjusts a frame sequence number of the currently processed object according to the frame sequence number of the previous padding frame, and assigns frame sequence numbers of the padding frames in the cache queue based on the adjusted frame sequence number of the currently processed object and positions of the padding frames in the cache queue. If the currently processed object is not the key frame, after assigning the frame sequence numbers of the padding frames in the cache queue based on the adjusted frame sequence number of the currently processed object and the positions of the padding frames in the cache queue, the detection module 304 further needs to detect whether the frame sequence number corresponding to the assigned padding frame is greater than a preset threshold. If yes, the terminal resets the frame sequence number greater than the preset threshold to zero.

In some embodiments, the detection module 304 may be specifically configured to: use the next image frame subsequent the target image frame as the new target image frame in response to detecting that the target image frame is detected, to obtain a currently processed object, and detect a type of the currently processed object, insert the padding frames between the currently processed object and a next image frame of the currently processed object based on the padding frame information by using a frame sequence number of the currently processed object as a benchmark, when a detection result indicates that the currently processed object is a key frame; adjust the frame sequence number of the currently processed object according to a frame sequence number corresponding to a previous frame of the currently processed object in response to detecting that the target image frame is not the key frame, and insert the padding frames between the currently processed object and the next image frame of the currently processed object based on the padding frame information; and perform the operation of using the next image frame subsequent the target image frame as the new target image frame to obtain a currently processed object, until all the image frames in the image frame set are decoded.

The rendering module 305 is configured to render the decoded image frames to play the image sequence.

In this application, because the padding frame is a P-skip frame, the rendering module 305 only decodes but not renders the P-skip frame, while each video frame in the image frame set is decoded, rendered, and played, so as to reduce time delay caused by video decoding and improve the smoothness of image processing.

In this application, after the receiving module 301 receives padding frame information transmitted by a server and an image frame set of a to-be-processed image sequence, the determining module 302 inputs the image frame set frame by frame to a cache queue of a decoder and determines an image frame currently located at the first position of the cache queue as a target image frame. Next, the insertion module 303 inserts padding frames between the target image frame and a next image frame subsequent the target image frame based on the padding frame information, so that the remaining frames other than the target image frame in the cache queue are the padding frames. The detection module 304 uses the next image frame subsequent the target image frame as a new target image frame in response to detecting that the target image frame is decoded, and performs the step of inserting padding frames between the new target image frame and a next image frame subsequent the new target image frame based on the padding frame information, until all image frames in the image frame set are decoded. Finally, the rendering module 305 renders the decoded image frames to play the image sequence. In the image processing apparatus provided in this application, the padding frames are inserted between the target image frame and the next image frame subsequent the target image frame, so that the target image frame is located at the first position of the cache queue, and the remaining frames other than the target image frame in the cache queue are the padding frames, which improves the speed of decoding the image frame by the terminal, and reduces time delay caused by video decoding, thereby improving the efficiency of image processing.

Figure 4:
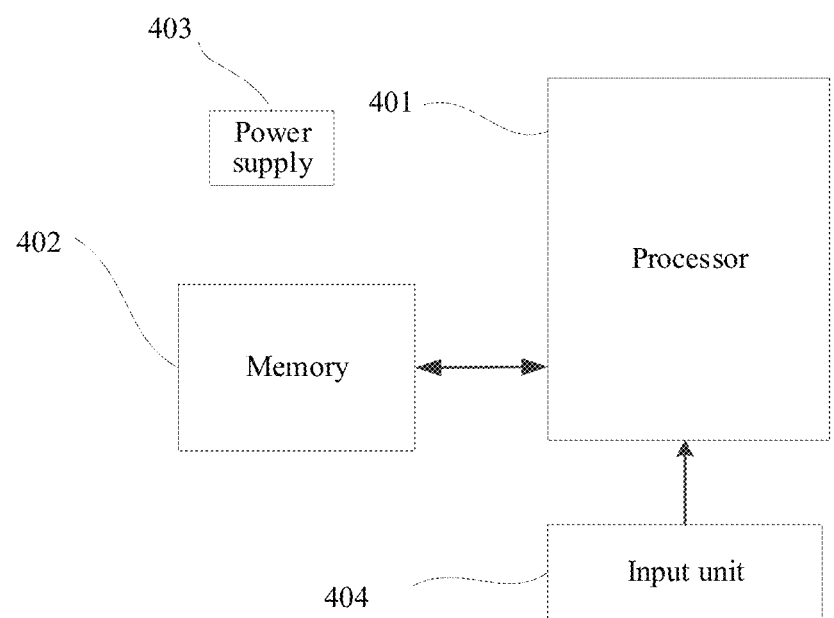
FIG. 4 is a schematic structural diagram of an electronic device according to an embodiment of this application.

In addition, this application further provides an electronic device. FIG. 4 is a schematic structural diagram of the electronic device according to this application. Specifically, the electronic device may include components such as a processor 401 with one or more processing cores, a memory 402 with one or more computer-readable storage medium, a power supply 403, and an input unit 404. A person skilled in the art may understand that the electronic device structure shown in FIG. 4 does not constitute a limitation to the electronic device. The electronic device may include more or fewer components than those shown in the figure, or some components may be combined, or a different component deployment may be used.

The processor 401 is a control center of the electronic device, and connects various parts of the entire electronic device by using various interfaces and lines. By running or executing a software program and/or a module stored in the memory 402, and invoking data stored in the memory 402, the processor performs various functions of the electronic device and processes data, thereby performing overall monitoring on the electronic device. The processor 401 may include one or more processing cores. The processor 401 may integrate an application processor and a modem processor. The application processor mainly processes an operating system, a user interface, an application program, and the like. The modem processor mainly processes wireless communication. It can be understood that the foregoing modem processor may alternatively not be integrated into the processor 401.

The memory 402 may be configured to store a software program and a module, and the processor 401 runs the software program and the module that are stored in the memory 402, to implement various functional applications and data processing. The memory 402 may mainly include a program storage area and a data storage area. The program storage area may store an operating system, an application program required by at least one function (for example, a sound playback function and an image playback function), or the like; and the data storage area may store data created according to use of the electronic device. In addition, the memory 402 may include a high speed random access memory, and may further include a non-transitory memory, such as at least one magnetic disk storage device, a flash memory, or another volatile solid-state storage device. Correspondingly, the memory 402 may further include a memory controller, to provide access of the processor 401 to the memory 402.

The electronic device further includes the power supply 403 for supplying power to the components. The power supply 403 may logically connect to the processor 401 by using a power supply management system, thereby implementing functions, such as charging, discharging, and power consumption management, by using the power supply management system. The power supply 403 may further include one or more direct current or alternating current power supplies, a re-charging system, a power failure detection circuit, a power supply converter or inverter, a power supply state indicator, and any other component.

The electronic device may further include the input unit 404. The input unit 404 may be configured to receive inputted numeric or character information and generate keyboard, mouse, joystick, optical, or trackball signal input related to user settings and function control.

Although not shown in the figure, the electronic device may further include a display unit, and the like. Details are not described herein again. Specifically, in this embodiment, the processor 401 of the electronic device may load, according to the following instructions, executable files corresponding to processes of one or more application programs into the memory 402. The processor 401 runs the application programs stored in the memory 402, to implement the various functions as follows:

receiving padding frame information transmitted by a server and an image frame set of a to-be-processed image sequence; inputting the image frame set frame by frame to a cache queue of a decoder, and determining an image frame currently located at the first position of the cache queue as a target image frame; inserting padding frames between the target image frame and a next image frame subsequent the target image frame based on padding frame information; using the next image frame subsequent the target image frame as a new target image frame in response to detecting that the target image frame is decoded, and performing the step of inserting padding frames between the new target image frame and a next image frame subsequent the new target image frame based on the padding frame information, until all image frames are decoded; and rendering the decoded image frames to play the image sequence.

For specific implementation of the foregoing operations, reference may be made to the foregoing embodiments. Details are not described herein again.

In this application, after padding frame information transmitted by a server and an image frame set of a to-be-processed image sequence are received, the image frame set is inputted frame by frame to a cache queue of a decoder and an image frame currently located at the first position of the cache queue is determined as a target image frame. Next, padding frames are inserted between the target image frame and a next image frame subsequent the target image frame based on the padding frame information, so that the remaining frames other than the target image frame in the cache queue are the padding frames. The next image frame subsequent the target image frame is used as a new target image frame when it is detected that the target image frame is decoded, and the step of inserting padding frames between the target image frame and a next image frame subsequent the target image frame based on the padding frame information is performed until all image frames are decoded. Finally, the decoded image frames are rendered to play the image sequence. In the image processing method provided in this application, the padding frames are inserted between the target image frame and the next image frame subsequent the target image frame, so that the target image frame is located at the first position of the cache queue, and the remaining frames other than the target image frame in the cache queue are the padding frames, which improves the speed of decoding the image frame by the terminal, and reduces time delay caused by video decoding, thereby improving the efficiency of image processing.

A person of ordinary skill in the art may understand that, all or some steps of the methods in the foregoing embodiments may be implemented by using instructions, or implemented through instructions controlling relevant hardware, and the instructions may be stored in a computer-readable storage medium and loaded and executed by a processor.

Accordingly, this application provides a non-transitory computer-readable storage medium, storing a plurality of instructions. The instructions can be loaded by the processor, to perform the steps in any image processing method according to this application. For example, the instructions may perform the following steps:

receiving padding frame information transmitted by a server and an image frame set of a to-be-processed image sequence; inputting the image frame set frame by frame to a cache queue of a decoder, and determining an image frame currently located at the first position of the cache queue as a target image frame; inserting padding frames between the target image frame and a next image frame subsequent the target image frame based on padding frame information; using the next image frame subsequent the target image frame as a new target image frame in response to detecting that the target image frame is decoded, and performing the step of inserting padding frames between the new target image frame and a next image frame subsequent the new target image frame based on the padding frame information, until all image frames are decoded; and rendering the decoded image frames to play the image sequence.

For specific implementation of the foregoing operations, reference may be made to the foregoing embodiments. Details are not described herein again.

The storage medium may include a read-only memory (ROM), a random access memory (RAM), a magnetic disk, an optical disc, or the like.

Because the instructions stored in the storage medium may perform the steps of any image processing method provided in this application, the instructions can implement beneficial effects that may be implemented by any image processing method in this application. For details, refer to the foregoing embodiments. Details are not described herein again.

The system related to this application may be a distributed system formed by connecting a client to a plurality of nodes (computing devices in any form in an access network, such as, servers and user terminals) in a network communication form.

Figure 5:
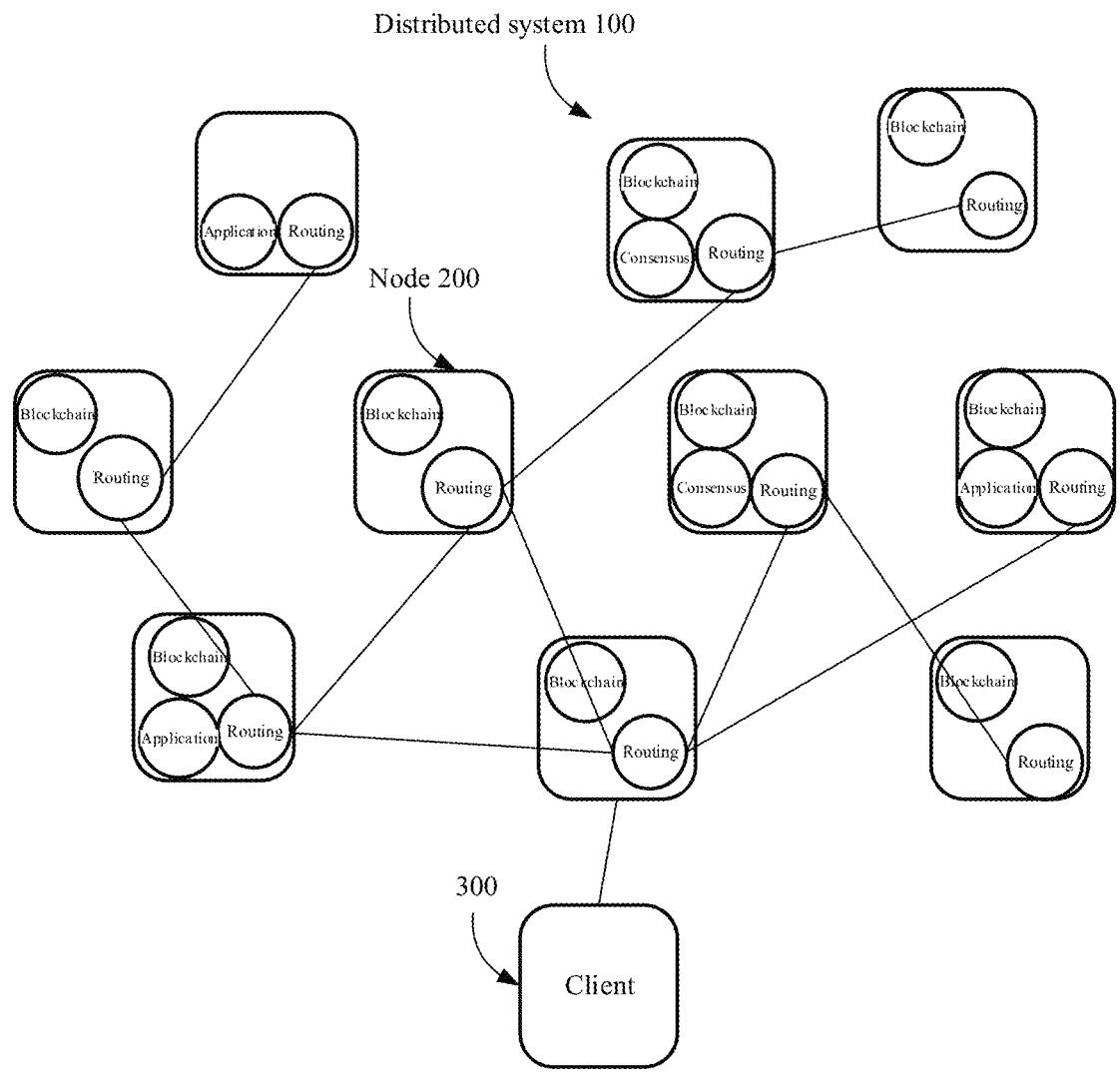
FIG. 5 is a schematic structural diagram of a distributed system 100 applied to a blockchain system according to an embodiment of this application.

For example, the distributed system is a blockchain system. Referring to FIG. 5, FIG. 5 is a schematic structural diagram of a distributed system 100 applied to a blockchain system according to this application. The distributed system is formed of a plurality of nodes (computing devices in any form in an access network, such as, servers and user terminals) and a client. A peer-to-peer (P2P) network is formed between the nodes. The P2P protocol is an application-layer protocol running over the Transmission Control Protocol (TCP). Any machine such as a server or a terminal may be added to the distributed system to become a node. The nodes include a hardware layer, an intermediate layer, an operating system layer, and an application layer.

Referring to functions of each node in the blockchain system shown in FIG. 5, the related functions include the following:

(1) Routing: which is a basic function of a node, and is used for supporting communication between nodes.

In addition to the routing function, the node may further have the following functions:

(2) Application: which is deployed in a blockchain, and is used for implementing a particular service according to an actual service requirement, recording data related to function implementation to form recorded data, adding a digital signature to the recorded data to indicate a source of task data, and transmitting the recorded data to another node in the blockchain system, so that the another node adds the recorded data to a temporary block when successfully verifying a source and integrity of the recorded data.

For example, a service implemented by this application may include: blockchain: including a series of blocks that are consecutive in a chronological order of generation. Once a new block is added to the blockchain, the new block is no longer removed. The block records recorded data submitted by the node in the blockchain system.

Figure 6:
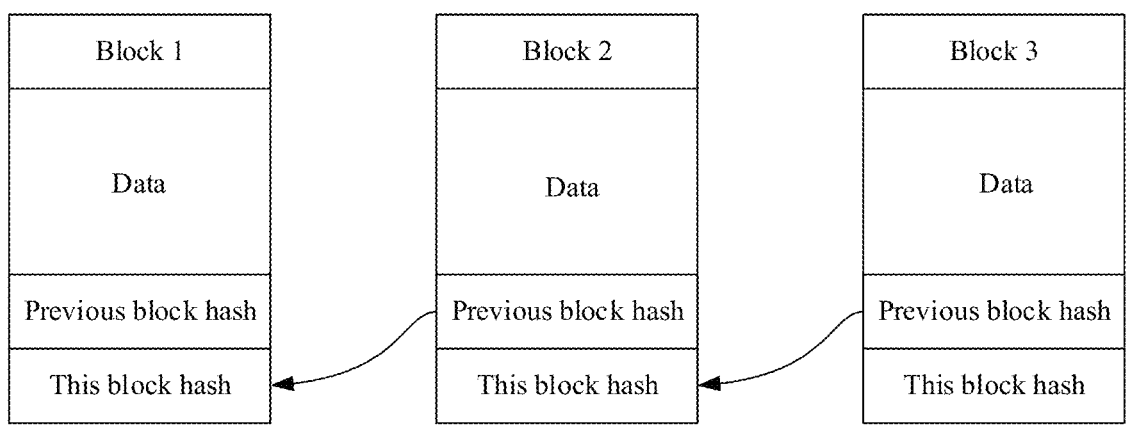
FIG. 6 is a schematic diagram of a block structure according to an embodiment of this application.

FIG. 6 is a schematic diagram of a block structure according to this application. Each block includes a hash value of a transaction record stored in the current block (a hash value of the current block) and a hash value of a previous block. Blocks are connected according to hash values to form a blockchain. In addition, the block may further include information such as a timestamp indicating a block generation time. A blockchain is a decentralized database essentially, and is a series of associated data blocks generated by using a cryptographic method. Each data block includes related information, and is configured to verify the validity (anti-counterfeiting) of the information of the data block, and generate a next block.

An image processing method and apparatus, an electronic device, and a storage medium provided in this application are described in detail above. The principle and implementation of the present invention are described herein through specific examples. The description about the embodiments of the present invention is merely provided for ease of understanding of the method and core ideas of the present invention. Meanwhile, a person skilled in the art may make variations to the present invention in terms of the specific implementations and application scopes according to the ideas of the present invention. Therefore, the content of the specification shall not be construed as a limit to the present invention. In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. An image processing method performed at an electronic device, the method comprising:
    receiving padding frame information transmitted by a server and an image frame set of a to-be-processed image sequence, the padding frame information being generated by the server according to the image frame set;
    inputting the image frame set frame by frame to a cache queue of a decoder, and determining an image frame currently located at a first position of the cache queue as a target image frame;
    inserting padding frames between the target image frame and a next image frame subsequent the target image frame based on the padding frame information, so that the remaining frames other than the target image frame in the cache queue are the padding frames;
    using the next image frame subsequent the target image frame as a new target image frame in response to detecting that the target image frame is decoded, and performing the operation of inserting padding frames between the new target image frame and a next image frame subsequent the new target image frame based on the padding frame information, until all image frames in the image frame set are decoded; and
    processing the decoded image frames and displaying a processing result of the decoded image frames.

2. The method according to claim 1, wherein the inserting padding frames between the target image frame and a next image frame subsequent the target image frame based on the padding frame information comprises:
    extracting a padding frame set generated by the server according to the image frame set from the padding frame information;
    selecting a padding frame corresponding to the target image frame in the padding frame set to obtain a target padding frame; and
    inserting a preset quantity of target padding frames between the target image frame and the next image frame subsequent the target image frame.

3. The method according to claim 2, wherein the inserting a preset quantity of target padding frames between the target image frame and the next image frame subsequent the target image frame comprises:
    detecting a maximum cache quantity corresponding to the cache queue;
    generating a padding quantity according to the target image frame and the maximum cache quantity; and
    inserting target padding frames corresponding to the padding quantity between the target image frame and the next image frame subsequent the target image frame.

4. The method according to claim 3, wherein after the inserting target padding frames corresponding to the padding quantity between the target image frame and the next image frame subsequent the target image frame, the method further comprises:
    extracting a frame sequence number of the target image frame; and
    assigning frame sequence numbers of the padding frames in the cache queue based on the frame sequence number and corresponding positions of the padding frames in the cache queue.

5. The method according to claim 4, wherein the assigning frame sequence numbers of the padding frames in the cache queue based on the frame sequence number and corresponding positions of the padding frames in the cache queue comprises:
    extracting an offset corresponding to the padding frames in the cache queue from the padding frame information; and
    assigning the frame sequence numbers of the padding frames in the cache queue based on the frame sequence number, the corresponding positions of the padding frames in the cache queue, and the offset corresponding to the padding frames in the cache queue.

6. The method according to claim 1, wherein the using the next image frame subsequent the target image frame as a new target image frame in response to detecting that the target image frame is decoded, and performing the operation of inserting padding frames between the new target image frame and a next image frame subsequent the new target image frame based on padding frame information, until all image frames in the image frame set are decoded comprises:

using the new target image frame to obtain a currently processed object in response to detecting that the target image frame is decoded;
detecting a type of the currently processed object;
inserting the padding frames between the currently processed object and a next image frame of the currently processed object based on the padding frame information by using a frame sequence number of the currently processed object as a benchmark, when a detection result indicates that the currently processed object is a key frame;
adjusting a frame sequence number of the currently processed object according to a frame sequence number corresponding to a previous frame of the currently processed object in response to detecting that the currently processed object is not the key frame, and inserting the padding frames between the currently processed object and the next image frame of the currently processed object based on the padding frame information; and
performing the operation of using the new target image frame to obtain a currently processed object until all the image frames are decoded.

7. The method according to claim 1, wherein the inputting the image frame set frame by frame to a cache queue of a decoder, and determining an image frame currently located at the first position of the cache queue as a target image frame comprises:
obtaining a key frame of a currently rendered to-be-processed image sequence to obtain a target key frame;
determining a next image frame of the target key frame in the image frame set as a target image frame; and
storing the target image frame at the first position of the cache queue.

8. An electronic device, comprising a memory, a processor, and a computer program stored in the memory and capable of being run on the processor, the processor, when executing the program, causing the electronic device to perform an image processing method including:
receiving padding frame information transmitted by a server and an image frame set of a to-be-processed image sequence, the padding frame information being generated by the server according to the image frame set;
inputting the image frame set frame by frame to a cache queue of a decoder, and determining an image frame currently located at a first position of the cache queue as a target image frame;
inserting padding frames between the target image frame and a next image frame subsequent the target image frame based on the padding frame information, so that the remaining frames other than the target image frame in the cache queue are the padding frames;
using the next image frame subsequent the target image frame as a new target image frame in response to detecting that the target image frame is decoded, and performing the operation of inserting padding frames between the new target image frame and a next image frame subsequent the new target image frame based on the padding frame information, until all image frames in the image frame set are decoded; and
processing the decoded image frames and displaying a processing result of the decoded image frames.

9. The electronic device according to claim 8, wherein the inserting padding frames between the target image frame and a next image frame subsequent the target image frame based on the padding frame information comprises:
extracting a padding frame set generated by the server according to the image frame set from the padding frame information;
selecting a padding frame corresponding to the target image frame in the padding frame set to obtain a target padding frame; and
inserting a preset quantity of target padding frames between the target image frame and the next image frame subsequent the target image frame.

10. The electronic device according to claim 9, wherein the inserting a preset quantity of target padding frames between the target image frame and the next image frame subsequent the target image frame comprises:
detecting a maximum cache quantity corresponding to the cache queue;
generating a padding quantity according to the target image frame and the maximum cache quantity; and
inserting target padding frames corresponding to the padding quantity between the target image frame and the next image frame subsequent the target image frame.

11. The electronic device according to claim 10, wherein after the inserting target padding frames corresponding to the padding quantity between the target image frame and the next image frame subsequent the target image frame, the method further comprises:
extracting a frame sequence number of the target image frame; and
assigning frame sequence numbers of the padding frames in the cache queue based on the frame sequence number and corresponding positions of the padding frames in the cache queue.

12. The electronic device according to claim 11, wherein the assigning frame sequence numbers of the padding frames in the cache queue based on the frame sequence number and corresponding positions of the padding frames in the cache queue comprises:
extracting an offset corresponding to the padding frames in the cache queue from the padding frame information; and
assigning the frame sequence numbers of the padding frames in the cache queue based on the frame sequence number, the corresponding positions of the padding frames in the cache queue, and the offset corresponding to the padding frames in the cache queue.

13. The electronic device according to claim 8, wherein the using the next image frame subsequent the target image frame as a new target image frame in response to detecting that the target image frame is decoded, and performing the operation of inserting padding frames between the new target image frame and a next image frame subsequent the new target image frame based on padding frame information, until all image frames in the image frame set are decoded comprises:
using the new target image frame to obtain a currently processed object in response to detecting that the target image frame is decoded;
detecting a type of the currently processed object;
inserting the padding frames between the currently processed object and a next image frame of the currently processed object based on the padding frame information by using a frame sequence number of the currently processed object as a benchmark, when a detection result indicates that the currently processed object is a key frame;
adjusting a frame sequence number of the currently processed object according to a frame sequence number corresponding to a previous frame of the currently processed object in response to detecting that the currently processed object is not the key frame, and inserting the padding frames between the currently processed object and the next image frame of the currently processed object based on the padding frame information; and performing the operation of using the new target image frame to obtain a currently processed object until all the image frames are decoded.

14. The electronic device according to claim 8, wherein the inputting the image frame set frame by frame to a cache queue of a decoder, and determining an image frame currently located at the first position of the cache queue as a target image frame comprises:

obtaining a key frame of a currently rendered to-be-processed image sequence to obtain a target key frame;

determining a next image frame of the target key frame in the image frame set as a target image frame; and storing the target image frame at the first position of the cache queue.

15. A non-transitory computer-readable storage medium, storing a computer program, the computer program, when executed by a processor of an electronic device, causing the electronic device to perform an image processing method including:

receiving padding frame information transmitted by a server and an image frame set of a to-be-processed image sequence, the padding frame information being generated by the server according to the image frame set;

inputting the image frame set frame by frame to a cache queue of a decoder, and determining an image frame currently located at a first position of the cache queue as a target image frame;

inserting padding frames between the target image frame and a next image frame subsequent the target image frame based on the padding frame information, so that the remaining frames other than the target image frame in the cache queue are the padding frames;

using the next image frame subsequent the target image frame as a new target image frame in response to detecting that the target image frame is decoded, and performing the operation of inserting padding frames between the new target image frame and a next image frame subsequent the new target image frame based on the padding frame information, until all image frames in the image frame set are decoded; and processing the decoded image frames and displaying a processing result of the decoded image frames.

16. The non-transitory computer-readable storage medium according to claim 15, wherein the inserting padding frames between the target image frame and a next image frame subsequent the target image frame based on the padding frame information comprises:

extracting a padding frame set generated by the server according to the image frame set from the padding frame information;

selecting a padding frame corresponding to the target image frame in the padding frame set to obtain a target padding frame; and inserting a preset quantity of target padding frames between the target image frame and the next image frame subsequent the target image frame.

17. The non-transitory computer-readable storage medium according to claim 16, wherein the inserting a preset quantity of target padding frames between the target image frame and the next image frame subsequent the target image frame comprises:

detecting a maximum cache quantity corresponding to the cache queue;

generating a padding quantity according to the target image frame and the maximum cache quantity; and inserting target padding frames corresponding to the padding quantity between the target image frame and the next image frame subsequent the target image frame.

18. The non-transitory computer-readable storage medium according to claim 17, wherein after the inserting target padding frames corresponding to the padding quantity between the target image frame and the next image frame subsequent the target image frame, the method further comprises:

extracting a frame sequence number of the target image frame; and assigning frame sequence numbers of the padding frames in the cache queue based on the frame sequence number and corresponding positions of the padding frames in the cache queue.

19. The non-transitory computer-readable storage medium according to claim 15, wherein the using the next image frame subsequent the target image frame as a new target image frame in response to detecting that the target image frame is decoded, and performing the operation of inserting padding frames between the new target image frame and a next image frame subsequent the new target image frame based on padding frame information, until all image frames in the image frame set are decoded comprises:

using the new target image frame to obtain a currently processed object in response to detecting that the target image frame is decoded;

detecting a type of the currently processed object;

inserting the padding frames between the currently processed object and a next image frame of the currently processed object based on the padding frame information by using a frame sequence number of the currently processed object as a benchmark, when a detection result indicates that the currently processed object is a key frame;

adjusting a frame sequence number of the currently processed object according to a frame sequence number corresponding to a previous frame of the currently processed object in response to detecting that the currently processed object is not the key frame, and inserting the padding frames between the currently processed object and the next image frame of the currently processed object based on the padding frame information; and performing the operation of using the new target image frame to obtain a currently processed object until all the image frames are decoded.

20. The non-transitory computer-readable storage medium according to claim 15, wherein the inputting the image frame set frame by frame to a cache queue of a decoder, and determining an image frame currently located at the first position of the cache queue as a target image frame comprises:

obtaining a key frame of a currently rendered to-be-processed image sequence to obtain a target key frame;

determining a next image frame of the target key frame in the image frame set as a target image frame; and storing the target image frame at the first position of the cache queue.

* * * * *